Patented Oct. 23, 1934

1,977,979

UNITED STATES PATENT OFFICE 1,977,979

PRODUCTION OF RESINOUS CONDENSATION PRODUCTS

Carl Winter and Nikolaus Roh, Ludwigshafen-on-the-Rhine, Germany, assignors to I. G. Farbenindustrie Aktiengesellschaft, Frankfort-on-the-Main, Germany No Drawing. Application May 27, 1932, Serial No. 614,038. In Germany June 4, 1931

8 Claims. (Cl. 260—2)

The present invention relates to the production of condensation products.

In the British specification No. 361,951 the present inventors have described a process for the production of condensation products, in which 1 molecular proportion of a non-basic partially hydrogenated aromatic compound free from sulphonic groups is heated to about 100° to 300° C., with more than four molecular proportions of an aralkyl halide, different from said compound and containing at least one further aliphatic or hydroaromatic radicle or of a naphthalene hydrogenated in one nucleus only and containing a halogenated alkyl group fixed to the other nucleus in the presence of condensing agents capable of assisting splitting off halogen hydrides from organic halogen compounds, and if desired, esterifying the resulting products.

We have now found that similar, resinous condensation products can also be obtained by heating one molecular proportion of an aromatic hydroxy-carboxylic acid substance, that is such acid in the free state or a derivative thereof, such as an ether of an aromatic hydroxy-carboxylic acid with an aliphatic or aromatic alcohol or an ester of an aromatic hydroxy-carboxylic acid with an aliphatic or aromatic alcohol, with at least 4 molecular proportions of an aralkyl halide containing at least one hydrocarbon, that is an aliphatic or aromatic hydrocarbon radicle connected to an aromatic nucleus besides the halogenalkyl groups, if desired in the presence of condensing agents of the kind described above.

The resulting condensation products are resinous and are distinguished by their ready solubility in vegetable drying oils such as linseed oil, China wood oil and oil of turpentine, a specially noticeable property being their extremely good fastness to light and their hardness. As a rule they are slightly acid and practically insoluble in alkalies, and for the most part can be directly employed for the preparation of oil varnishes. In the event of their acid value being too high for oil varnish, the new condensation products may be esterified by an after-treatment with monohydric or polyhydric alcohols, such as glycols, glycerol or n-octodecyl alcohol, or with phenols or still soluble phenol-formaldehyde condensation products. The following may be mentioned as aromatic or like hydroxycarboxylic acids: salicylic acid, p-hydroxybenzoic acid, the isomeric cresol carboxylic acids and hydroxynaphthoic acids, and also their esters and ethers. Representatives of the said aralkyl halides comprise the isomeric dimethylbenzyl, mono- and tri-methyl benzyl- and isopropylbenzyl chlorides or bromides obtainable as mixtures of the isomers from crude commercial mixtures of the isomers of xylene, or from toluene, and isopropyl benzene, by means of formaldehyde and hydrochloric acid, as well as 1.2.3.4-tetrahydro-6-ω-chlormethyl naphthaline obtainable from tetrahydronaphthalene. In most cases dimethyl benzyl halides have proved best. It is frequently advantageous to condense mixtures of aromatic hydroxycarboxylic acids with mixtures of aralkyl halides. In most cases the quantity of aralkyl halide employed will be largely above 4 molecular proportions per molecular proportion of carboxylic acid, about 20 molecular proportions of dimethyl benzyl chloride giving the best results for example with 1 molecular proportion of salicylic acid.

The condensing agents may consist of the anhydrous metallic salts usually employed in organic chemistry for splitting off halogen hydrides, such as zinc chloride, aluminium chloride or ferric chloride, or metals such as zinc, tin, aluminium or iron. Superficially active substances, such as fuller's earth, or different kinds of bleaching earths commercially known under the trade name "Tonsil" are also available as condensing agents. When operating without condensing agents and at somewhat increased temperatures, the resulting products are generally softer and frequently contain halogen in contrast to those prepared without condensing agents.

The temperatures to be employed in the process may vary within wide limits, approximately between 80° and 300° C. but preferably between about 100° to 250° C. and while gradually raising it from say 120° to about 240° C. The condensation may be performed in the presence of inert organic solvents, such as p-dichlorbenzene, 1.2.4-trichlorbenzene, ligroin and other saturated gasoline fractions boiling between about 150° and about 200° C., dekahydronaphthalene and like volatile hydrocarbons, under which conditions the condensation proceeds more quietly and uniformly. When the condensation is completed, the solvent can be eliminated from the resulting resin in any convenient manner, such as by distillation, the passage of a current of air, carbon dioxide, nitrogen and other inert means, and if desired at a pressure below atmospheric pressure.

The following examples will further illustrate how this invention may be carried out in practice, but the invention is not restricted to these examples. The parts are by weight.

Example 1

175 parts of dimethyl benzyl chloride (mixed isomers, prepared by acting on a commercial mixture of the isomers of xylene with formaldehyde and hydrochloric acid) are heated and stirred with 9 parts of salicylic acid and 0.01 part of zinc, under a reflux condenser. At about 125° C., a strong disengagement of gaseous hydrochloric acid occurs and is accelerated by gradually raising the temperature to about 220° C. It ceases when nearly the theoretical amount of hydrochloric acid (about 40 parts) has been evolved. Small quantities of secondary oily substances can be removed by blowing nitrogen through the melt. About 140 parts of a pale, clear resin, with the (Krämer-Sarnow) softening point 129° C., and the acid value 18 are obtained. It is readily soluble in linseed oil, China wood oil, benzene, benzine, oil of turpentine and esters, such as normal and iso-butyl and normal and iso-amyl acetates, but not in ethyl alcohol.

Example 2

150 parts of dimethyl benzyl chloride (mixed isomers) prepared as described in Example 1, 15 parts of p-hydroxy-benzoic acid and 50 parts of 1.2.4-trichlorbenzene are stirred and slowly heated, with the addition of 0.01 part of zinc chloride, to 230° C. under a reflux condenser. After the liberation of gaseous hydrochloric acid commencing at about 135° C., has ceased, the trichlorbenzene is distilled off by passing through a gentle current of carbon dioxide. 129 parts of a brownish red resin remain with the (Krämer-Sarnow) softening point 126° C. and the acid value 40. In order to reduce the acid value, the resinification can be followed by esterification with glycerol or with phenols. The resin is readily soluble in linseed oil, China wood oil, oil of turpentine and aromatic hydrocarbons or mixtures thereof such as benzene, toluene, commercial mixtures of isomeric xylenes or solvent naphtha.

Example 3

200 parts of methyl benzyl chloride (mixed isomers), prepared by acting on toluene with formaldehyde and hydrochloric acid and 20 parts of salicylic acid are condensed in the manner described in Examples 1 and 2 with the addition of 0.01 part of aluminium in the form of grains or of powder. About 157 parts of a brownish-yellow resin are obtained, which has the (Krämer-Sarnow) softening point 91° C. and the acid value 17. It is readily soluble in linseed oil, oil of turpentine and aromatic hydrocarbons as referred to in Example 2.

Example 4

150 parts of dimethyl benzyl chloride (mixed isomers) prepared as described in Example 1, 7.5 parts of salicylic acid and 7.5 parts of p-cresol carboxylic acid (COOH=1; OH=2; CH$_3$=5), are slowly heated to 225° C., under a reflux condenser, with the addition of 0.01 part of iron. As soon as the liberation of gaseous hydrochloric acid has ceased, the melt is poured out into pans. About 123 parts of a brownish-yellow resin are obtained, having the (Krämer-Sarnow) softening point 124° C. and the acid value 14; it is easily boiled down to an oil varnish with linseed oil.

Example 5

200 parts of 1.2.3.4-tetrahydro-6-6-chlormethylnaphthalene, prepared by treating tetrahydronaphthalene with formaldehyde and hydrochloric acid, and 40 parts of orthocresol carboxylic acid (COOH=1; OH=2; CH$_3$=3) are condensed as in Example 4, with the addition of 0.01 part of zinc. About 185 parts of brownish-yellow resin are obtained, having the (Krämer-Sarnow) softening point 116° C. and the acid value 25; it is readily soluble in linseed oil, China wood oil, oil of turpentine and aromatic hydrocarbons, but not in ethyl alcohol.

Example 6

200 parts of dimethyl benzyl bromide (mixed isomers), prepared by acting on a commercial mixture of the isomers of xylene with formaldehyde and hydrobromic acid, or by acting on a mixture of the isomers of dimethyl benzyl chloride with potassium bromide, and 20 parts of salicylic acid are condensed as described in the preceding examples, with the addition of 0.01 part of zinc. About 131 parts of a dark brown resin are obtained having the (Krämer-Sarnow) softening point 114° C., and the acid value 21. It can be easily boiled down to an oil varnish.

Example 7

150 parts of commercial dimethyl benzyl chloride (mixed isomers), prepared as described in Example 1, 15 parts of β-hydroxynaphthoic acid and 50 parts of 1.2.4-trichlorbenzene are heated with the addition of 0.01 part of tin, under a reflux condenser until the temperature of the melt has risen to 230° C. After distilling off the trichlorbenzene while passing through a current of nitrogen there remain about 125 parts of a dark brownish-yellow resin, with the (Krämer-Sarnow) softening point 230° C. and the acid value 31. It is readily soluble in linseed oil, oil of turpentine and aromatic hydrocarbons.

Example 8

150 parts of commercial dimethyl benzyl chloride (mixed isomers) and 15 parts of salicylic phenyl ester are heated, while stirring, to 230° C., with the addition of 0.01 part of zinc, until the evolution of gaseous hydrochloric acid has ceased. After passing through a current of nitrogen, 124 parts of a light yellow, neutral resin with the (Krämer-Sarnow) softening point 138° C. are obtained, which is readily soluble in linseed oil, oil of turpentine, benzine fractions boiling between 150° and 190° C. and aromatic hydrocarbons but not in ethyl alcohol. By employing 10 parts of the ethyl ester of salicylic acid instead of the phenyl ester a resin with a softening point of 112° C. is obtained which has the same solubility as that described above.

Example 9

150 parts of commercial dimethyl benzyl chloride (mixed isomers) and 25 parts of acetyl salicylic acid are heated, while stirring, under a reflux condenser with the addition of 0.01 part of zinc, the temperature being slowly raised to 230° C. and maintained at this temperature, until the evolution of gaseous hydrochloric acid has ceased. About 128 parts of a pale yellow resin are obtained, having a (Krämer-Sarnow) softening point 118° C. and the acid value 3. The resin is readily soluble in linseed oil, China wood oil, benzine fractions boiling between 150° and 190° C., oil of turpentine and aromatic hydrocarbons.

Example 10

100 parts of commercial dimethyl benzyl chloride (mixed isomers), 10 parts of o-methoxybenzoic acid and 0.01 part of zinc are heated in the manner described in Example 1. About 81 parts of a pale yellow resin are obtained, which is soluble in linseed oil, oil of turpentine, benzine fractions boiling between 150° and 190° C. and aromatic hydrocarbons and has a (Krämer-Sarnow) softening point 118° C. and the acid value 1.

*Example 11*

200 parts of commercial dimethyl benzyl chloride (mixed isomers) and 30 parts of salicylic acid are heated, while stirring, under a reflux condenser. At about 125° C. disengagement of gaseous hydrochloric acid takes place. The temperature is slowly raised to about 220° C. while stirring, the said temperature being maintained until the liberation of gaseous hydrochloric acid has ceased. Small quantities of secondary oily substances are then removed by blowing nitrogen through the melt. About 164 parts of a brown resin with the (Krämer-Sarnow) softening point 103° C., and the acid value 21 are obtained. It is readily soluble in linseed oil, China wood oil, oil of turpentine, benzine fractions rich in naphthene hydrocarbons and boils between about 150° and 200° C. and benzene, but is nearly insoluble in ethyl alcohol.

*Example 12*

200 parts of commercial dimethyl benzyl chloride (mixed isomers), containing about 5 per cent by weight of ω,ω'-dichlortetramethyl benzene (prepared by acting with formaldehyde and hydrochloric acid on commercial xylene), 12 parts of salicylic acid and 0.001 part of zinc chloride are slowly heated to about 250° C. under a reflux condenser, while stirring. Any impurities present are removed by blowing a current of nitrogen through the melt after the disengagement of gaseous hydrochloric acid has ceased. About 168 parts of a pale yellow, hard resin are obtained, having the (Krämer-Sarnow) softening point 145° C. and the acid value 10. The resin is soluble in linseed oil, China wood oil, oil of turpentine and aromatic hydrocarbons.

What we claim is:—

1. In the production of condensation products by heating aralkyl halides with aromatic compounds free from sulphonic groups, the step which comprises heating one molecular proportion of a substance selected from the group consisting of aromatic hydroxy-carboxylic acids and their esters and ethers with aliphatic or aromatic alcohols with at least four molecular proportions of an aralkyl compound containing at least one hydrocarbon radicle connected to an aromatic nucleus besides a $CH_2$-halogen group.

2. In the production of condensation products by heating aralkyl halides with aromatic compounds free from sulphonic groups, the step which comprises heating one molecular proportion of a substance selected from the group consisting of aromatic hydroxy-carboxylic acids and their esters and ethers with aliphatic or aromatic alcohols with at least four molecular proportions of an aralkyl compound containing at least one aliphatic hydrocarbon radicle connected to an aromatic nucleus besides a $CH_2$-halogen group.

3. In the production of condensation products by heating aralkyl halides with aromatic compounds free from sulphonic groups, the step which comprises heating one molecular proportion of an aromatic hydroxy-carboxylic acid with at least four molecular proportions of an aralkyl compound containing at least one aliphatic hydrocarbon radicle connected to an aromatic nucleus besides a $CH_2$-halogen group.

4. In the production of condensation products by heating aralkyl halides with aromatic compounds free from sulphonic groups, the step which comprises heating one molecular proportion of an aromatic hydroxy-carboxylic acid to a temperature between about 100° and 250° C. with at least four molecular proportions of an aralkyl compound containing at least one aliphatic hydrocarbon radicle connected to an aromatic nucleus besides a $CH_2$-halogen group.

5. Resinous condensation products of one molecular proportion of a substance selected from the group consisting of aromatic hydroxy-carboxylic acids and their esters and ethers with aliphatic or aromatic alcohols with at least four molecular proportions of an aralkyl compound containing at least one hydrocarbon radicle connected to an aromatic nucleus besides a $CH_2$-halogen group, which products are soluble in vegetable drying oils.

6. Resinous condensation products of one molecular proportion of a substance selected from the group consisting of aromatic hydroxy-carboxylic acids and their esters and ethers with aliphatic or aromatic alcohols with at least four molecular proportions of a dimethyl benzyl chloride which products are soluble in vegetable drying oils.

7. Resinous condensation products of one molecular proportion of salicylic acid with at least four molecular proportions of a dimethyl benzyl chloride which products are soluble in vegetable drying oils.

8. Resinous condensation products of one molecular proportion of salicylic acid with about 20 molecular proportions of a dimethyl benzyl chloride.

CARL WINTER.
NIKOLAUS ROH.